Nov. 3, 1925.  
J. F. BERNHARDT  
1,560,200  
AUTOMOBILE SPRING CONSTRUCTION  
Filed Oct. 16, 1924
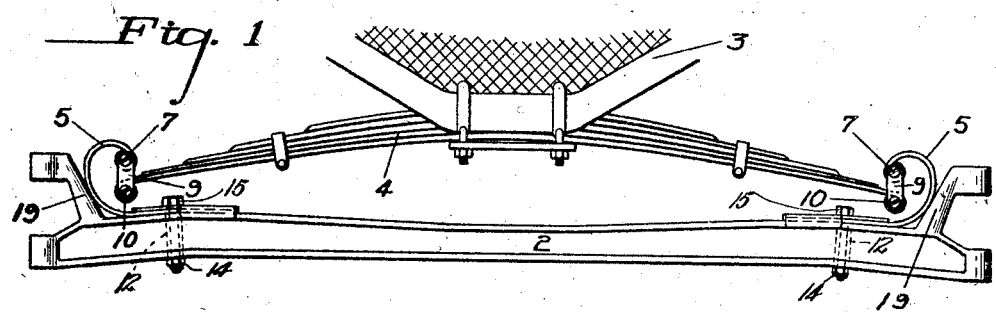
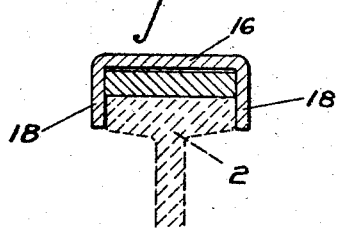
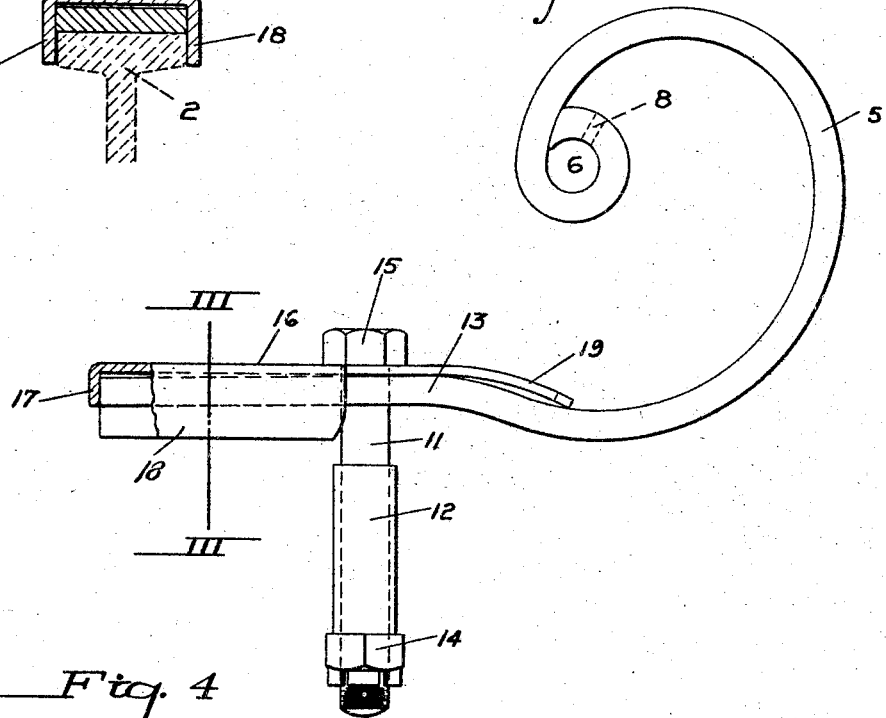
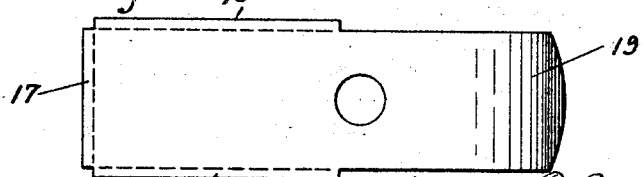
INVENTOR.
Joseph F. Bernhardt
BY
ATTORNEY.

Patented Nov. 3, 1925.

1,560,200

UNITED STATES PATENT OFFICE.

JOSEPH F. BERNHARDT, OF PITTSBURGH, PENNSYLVANIA, ASSIGNOR TO TRIANGLE AUTOMOBILE SPRING COMPANY, OF PITTSBURGH, PENNSYLVANIA, A CORPORATION OF PENNSYLVANIA.

AUTOMOBILE SPRING CONSTRUCTION.

Application filed October 16, 1924. Serial No. 743,941.

*To all whom it may concern:*

Be it known that I, JOSEPH F. BERNHARDT, a citizen of the United States, residing at Pittsburgh, in the county of Allegheny and State of Pennsylvania, have invented certain new and useful Improvements in Automobile Spring Constructions, of which the following is a specification.

My invention consists of an improvement in vehicle springs, and more particularly to springs for motor vehicles. It is particularly designed for adaptation to and combination with the standard spring and axle construction of a Ford automobile. The purpose is to amplify and improve the spring action of the usual body supporting leaf spring, which ordinarily extends lengthwise of the axle and between it and the body.

In the drawings, illustrating the construction and adaptation of the invention:

Fig. 1 is a view in front elevation, showing my improved spring incorporated between the axle and the terminals of the standard leaf spring;

Fig. 2 is a detail view in front elevation of the supplemental spring partly in section;

Fig. 3 is a sectional view on the line III—III of Fig. 2;

Fig. 4 is a plan view of the spring retaining and bolt receiving clamping plate.

In the drawings, 2 represents the usual standard axle of a Ford machine, between which and the engine supporting frame 3 is interposed the usual elliptic spring 4. Ordinarily, the terminals of spring 4 are supported upon and connected with the axle by the usual rigid perch or bracket.

In my invention, I utilize independent springs 5—5 at each end, of generally C form. Each of said springs is made of a suitable spring metal bar bent around in the form shown in Figs. 1 and 2, having an upper terminal eye 6, for connection with the end of main spring 4. Eye 6, formed by bending the end of the spring member into a circle, is provided with an oil hole 8, for lubrication, and is of the proper size to receive the connecting bolt 7 and maintain connection through links 9 with the bolt 10 passing through the usual terminal eye of main spring 4.

Spring 5, at its base, extends inwardly for a distance sufficiently long to lie over and fit upon the upper face of axle 2, and is secured thereon by a bolt 11, which occupies the position and passes through the standard hole ordinarily provided for the discarded perch. In the present construction, bolt 11 is preferably provided with a bushing 12 of a suitable size to fill the standard diameter of such original bolt hole, the bolt 11 itself being preferably of somewhat reduced cross section, to avoid reducing the cross sectional area of the spring 5. Said spring extends by its shank 13 inwardly along and over the upper face of the axle, to ensure a good bearing, being curved in conformity therewith so as to make a good holding connection when bolt 11 is tightened by its nut 14.

Interposed between the upper surface of spring shank 13 and the head 15 of the bolt is a washer plate 16 of the particular construction shown. Said plate, which originally conforms to the slightly curved outline of the spring shank, preferably arches above it slightly, as shown, so as to ensure a degree of individual spring action in preventing movement of the bolt or its nut. Plate 16 is turned downwardly at its inner end, as at 17, against the inner end of spring shank 13, and also at each side, providing embracing wings 18—18. These wings extend downwardly sufficiently far below the lower edge of the spring shank to engage against a portion or all of the upper usual flange of the eye beam form of axle 2, as clearly shown in Fig. 3. The inner portion 19 of the washer plate bears by its inner end downwardly against the upper surface of the spring shank.

When in position, and the bolt is tightened, the entire spring member 5 is fixedly and positively clamped upon the axle and occupies its supporting position at each end portion thereof. It not only forms the same connection between the main spring and axle, as was formerly done by the standard perch, but ensures a gradual greatly increased resiliency in the general spring action.

The form of the spring 5 is particularly adapted to incorporation with the axle, utilizing its bolt hole in the manner described, and curving outwardly and upwardly with proper clearance just inside the usual steering knuckle bracket 20. As shown, the spring 5 bears by its outer curving face against the bracket 20, bracing the spring against outward spreading, and ensuring its spring action in an inward and downward direction under load. In action, the weight of the car and its load is transmitted to each outer terminal connecting spring 5, which, by its construction, imparts a considerably increased added resiliency, while maintaining the main spring 5 in correct alining position with the axle against any tendency to material variation, due to the shocks or strains of traffic.

While the invention as designed and applied is particularly adapted to cars of the type stated, it will be obvious that it is also suited to other similar constructions in which the same conditions and standard equipment exist, involving merely such changes in proportions, measurements, etc. as are entirely within the skill of the designing builder or engineer.

The invention may, therefore, be changed or varied in such detail construction, but all such changes are to be considered as within the scope of the following claims.

What I claim is:

1. The combination with an axle having a steering knuckle bracket and a main body supporting spring, of an intervening C-shaped spring having a flattened shank portion resting on the axle, a washer plate having a lateral wing extending down over the edge of the shank portion and engaging the side face of the axle, and a securing bolt extending through the washer plate, spring shank, and axle, respectively.

2. The combination with an axle having a steering knuckle bracket and a main body supporting spring, of an intervening C-shaped spring having a flattened shank portion resting on the axle and against the knuckle bracket, a washer plate having lateral wings extending down over opposite edges of the shank portion and engaging the side faces of the axle, and a securing bolt extending through the washer plate, spring shank, and axle, respectively.

3. The combination with an axle and a main body supporting spring, of an intervening C-shaped spring having a flattened shank portion resting on the axle, a washer plate having a lateral wing extending down over the edge of the shank portion and engaging the side face of the axle and a terminal lip extending down over the end of the spring shank, and a securing bolt extending through the washer plate, spring shank and axle, respectively.

4. The combination with an axle and a main body supporting spring, of an intervening C-shaped spring having an outer upper resilient portion terminating in a connecting eye and an extended shank portion resting on the axle, means connecting the eye with the terminal of the main spring, a securing washer plate having portions embracing the sides and end of the shank portion and the sides of the axle respectively, and a holding bolt extending through the washer plate, shank portion and axle, substantially as described.

5. The combination with an axle having a steering knuckle bracket, and a main body supporting spring, of an intervening C-shaped spring having a flattened shank portion resting on the axle and in bearing engagement with the knuckle bracket, a washer plate, and a securing bolt extending through the washer plate, spring shank, and axle respectively.

In testimony whereof I hereunto affix my signature.

JOSEPH F. BERNHARDT.